Oct. 28, 1952  L. SUKACEV  2,615,443
SELF-HEATING CONTAINER
Filed June 28, 1950
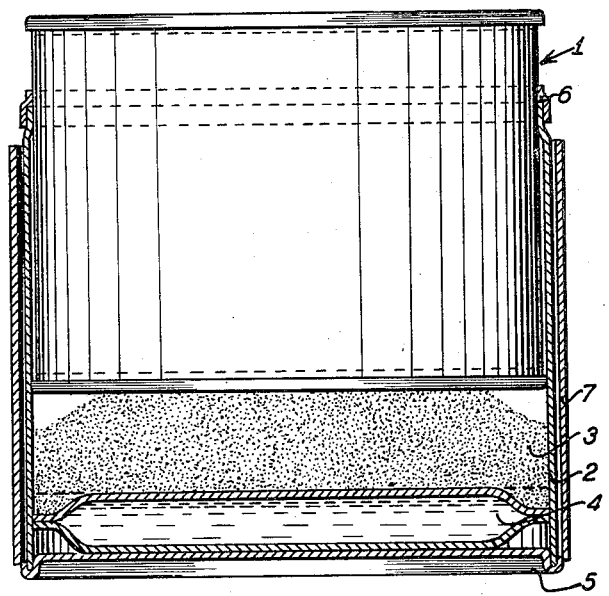
INVENTOR
LEV SUKACEV
BY *Ernest Lyzell*
his ATTORNEY Patented Oct. 28, 1952

2,615,443

UNITED STATES PATENT OFFICE 2,615,443

SELF-HEATING CONTAINER

Lev Sukacev, Chevy Chase, Md., assignor to himself and Varvara Sukacev, Washington, D. C.

Application June 28, 1950, Serial No. 170,757
In France June 28, 1949

4 Claims. (Cl. 126—263)

1

This invention relates to canned foods and more particularly to self-heating devices by which canned food and the like can be heated without recourse to extraneous fuel or other extraneous heating agents.

The primary object of the invention is to provide a self-heating device for canned foods and the like, wherein the food or other contents of a can are heated by the exothermic reaction of chemicals in the container.

Another object of the invention is to provide a self-heating device for canned foods and the like utilizing a chemical reaction for heating, in which the components of the reaction, while stored separately against accidental reaction, are readily mixed when heating is required.

A further object of the invention is to provide a self-heating container, in which a can of food or the like is assembled with a supplementary container in which the can sits, the container holding below the can the proper amount of lime and water to generate the heat required to heat the contents of the can and the water being stored in a capsule which is readily rupturable to start the reaction.

Other objects and advantages of the invention will appear hereinafter in the detailed description, be particularly pointed out in the appended claims and illustrated in the accompanying drawings, in which:

The figure is a side elevational view of a preferred embodiment of the device of the invention, with portions shown in vertical section to more clearly illustrate the details of construction.

Referring now in detail to the drawings in which like reference characters designate like parts, the improved self-heating container of the present invention has been applied, for illustrative purposes, to a sealed can 1 of the usual cylindrical shape, the food or other content of which is to be self-heated. For heating the can, there is provided an open-topped container or jacket 2, in which the can is adapted to seat or fit, the container being of the same shape as and of slightly greater inside diameter than the outside diameter of the can to permit vertical sliding movement of the can relative to the container. If, as in the illustrated embodiment, the ends of the can are crimped over its side, the container is necked after the can has been inserted or introduced to provide a sliding fit with the side of the can, as well as to limit the relative vertical movement of the can. While the chemical components by which heat is generated may be inserted in the container in advance of the can,

2 the granular or powdered condition of one of the components, the lime, would normally render it preferable to load these components from the bottom of the container to insure their segregation. Accordingly, the container 2 preferably is initially open at both ends and after the can has been inserted through its upper end and the latter crimped, the container is up-ended or inverted. A charge of lime 3 commensurate in quantity with the volume of the can is then introduced and on top of this lime layer is placed a capsule or cartridge 4 of water, distilled water being preferred. Thereafter, the bottom 5 of the container is applied and hermetically sealed in place.

The cartridge or capsule 4 in which the water is stored is designed to be ruptured in the manner hereinafter to be explained, so as to permit mixing of the water and lime when the can 1 is to be heated. Consequently, the material of which the capsule is made is required to be readily rupturable and, at the same time, inert to the components separately. It, therefore, may be made of any suitable material possessing these properties, such as plastic. The capsule of the illustrated embodiment is in the form of a hollow disk of thin lead which is made of identical parts sealed or joined together at their marginal edges. Intermediate its edge, each part in section is a trapezoid with the angles at the extremities of its sides rounded to facilitate rupture. As shown, the capsule is of substantially the inside diameter of the container 2.

Utilizing the structure described, it is possible to rupture the water capsule 4 by applying pressure through the can 1 against the lime layer 3. To permit the necessary movement for the application of such pressure, the can normally projects somewhat above the open upper end of the container. Both to hold the can in place to prevent accidental rupture of the capsule and to inhibit absorption of the moisture from the surrounding air by the lime, the open end of the container is sealed to the side of the can by an adhesive tape or strip 6 of rubberized material such as non-hygroscopic paraffin paper. If, as is preferred, the container is inverted for loading of the chemical components, this strip is preferably applied beforehand to maintain the relative positions of the can and container during loading. To facilitate handling during and after heating, the container is wrapped in a heat insulating wrapper 7 of corrugated paper or the like.

For heating the contents of the can 1, the container is placed, bottom down, on a table or other suitable support. The adhesive tape 6 is then ripped off and sufficient pressure is applied to the top of the can to cause the latter to sink within the container 2 and through the lime layer 3 applies sufficient force to the water capsule 4 to rupture the latter and release the water into the lime. This starts the exothermic reaction between the water and lime and within a few minutes steam rises between the walls of the can and container. Due to the volume augmentation of the water-lime mixture, in the course of the reaction, the can 1 will move up slowly as the reaction proceeds and ultimately pass and project considerably beyond its original position relative to the container. The completion of the exothermic reaction is signalled by the end of the steam.

With the same size can and amount of charge, the relative times from starting of the reaction by pushing down the can until the food can be served hot, are five minutes for liquids, ten minutes for semi-liquids and fifteen minutes for more solid products. By this method, it is possible to raise the temperature of liquids in a can about 115°–126° F. above their initial temperature, the limiting temperature being, of course, the temperature of reaction of the lime and water.

From the above detailed description it will be apparent that there has been provided an improved self-heating container which may be applied to cans of any size and, while particularly adapted for use with canned foods, may also be used for heating any other canned products. It should be understood that the described and disclosed embodiment is merely exemplary of the invention and that all modifications are intended to be included which do not depart either from the spirit of the invention or the scope of the appended claims.

Having described my invention, I claim:

1. A self-heating device for canned foods comprising a solid-walled container having an open end, and a food can slidably telescoping in said container through said open end, said container being adapted to contain within a closed end thereof between said container and said can chemical components for producing an exothermic reaction, and said can on reaction of said components telescoping outwardly relative to said container to permit a product of said reaction to expand while substantially restricting said product to said container.

2. A self-heating device for canned foods comprising a solid-walled container open at one end, a food can telescopingly seated in and slidably sealing said open end of said container, said container being adapted to contain within a closed end thereof between said container and said can chemical components for producing an exothermic reaction, and sealing means connecting said open end of said container to said can and normally preventing relative movement therebetween, said can on release of said sealing means and reaction of said components telescoping outwardly relative to said container to permit a product of said reaction to expand while restricting said product to said container.

3. A self-heating device for canned foods comprising a solid-walled container having an open end, a food can slidably telescoping in said container through said open end, said container being necked at said open end for slidably engaging the side of said can, said container being adapted to contain within a closed end thereof between said container and said can chemical components for producing an exothermic reaction, and said can on reaction of said components telescoping outwardly relative to said container to permit a product of said reaction to expand while substantially restricting said product to said container.

4. A self-heating device for canned foods comprising a solid-walled container open at one end, a food can slidably telescoping in and substantially sealing said open end of said container, chemical components contained in said container within a closed end thereof between said container and said can for producing an exothermic reaction, a rupturable seal normally separating said components and rupturing on depression of said can to permit reaction of said components and generation of gas within said container, and said can telescoping outwardly relative to said container on reaction of said components to permit a product of said reaction to expand while substantially restricting said product to said container, and sealing means connecting said open end of said container to said can and normally preventing relative movement therebetween.

LEV SUKACEV.

REFERENCES CITED

The following references are of record in the file of this patent:

UNITED STATES PATENTS

| Number | Name | Date |
|---|---|---|
| 820,638 | Gabriel | May 15, 1906 |
| 2,036,611 | Simmons | Apr. 7, 1936 |
| 2,157,169 | Foster | May 9, 1939 |
| 2,300,793 | Martin | Nov. 3, 1942 |

FOREIGN PATENTS

| Number | Country | Date |
|---|---|---|
| 16,822 | Great Britain | of 1904 |
| 2,360 | Great Britain | of 1915 |
| 73,654 | Australia | Aug. 10, 1917 |